United States Patent
Shim et al.

(10) Patent No.: US 11,841,423 B2
(45) Date of Patent: Dec. 12, 2023

(54) APPARATUS AND METHOD FOR RECOGNIZING OBJECT

(71) Applicant: HYUNDAI MOBIS Co., Ltd., Seoul (KR)

(72) Inventors: Yeon Joo Shim, Yongin-si (KR); Jin Woo Jung, Yongin-si (KR); Sang Won Park, Yongin-si (KR); Jun Seop Jeong, Yongin-si (KR)

(73) Assignee: HYUNDAI MOBIS Co., Ltd, Seoul (KR)

(*) Notice: Subject to any disclaimer, the term of this patent is extended or adjusted under 35 U.S.C. 154(b) by 644 days.

(21) Appl. No.: 16/996,722

(22) Filed: Aug. 18, 2020

(65) Prior Publication Data
US 2021/0190957 A1    Jun. 24, 2021

(30) Foreign Application Priority Data

Dec. 18, 2019   (KR) .................... 10-2019-0169549

(51) Int. Cl.
*G01S 15/00*   (2020.01)
*G01S 7/497*   (2006.01)
(Continued)

(52) U.S. Cl.
CPC .............. *G01S 15/00* (2013.01); *G01S 7/497* (2013.01); *G01S 7/539* (2013.01); *G01S 15/931* (2013.01)

(58) Field of Classification Search
CPC .......... G01S 15/00; G01S 7/497; G01S 7/539; G01S 15/931
See application file for complete search history.

(56) References Cited

U.S. PATENT DOCUMENTS

2013/0162461 A1* 6/2013 Lucking ................ G01S 13/931
                                                        367/99
2015/0097704 A1* 4/2015 Kwon .................. G01S 7/4808
                                                        340/932.2
(Continued)

FOREIGN PATENT DOCUMENTS

CN    104515970 A    4/2015
JP    2018-013448    1/2018
(Continued)

OTHER PUBLICATIONS

Office Action dated Jul. 27, 2021, issued to Korean Patent Application No. 10-2019-0169549.
(Continued)

*Primary Examiner* — Isam A Alsomiri
*Assistant Examiner* — Joseph C Fritchman
(74) *Attorney, Agent, or Firm* — H.C. Park & Associates, PLC

(57) ABSTRACT

Disclosed are an object recognition apparatus and method for a vehicle. The object recognition apparatus for a vehicle may include two or more sensors each configured to transmit a signal toward an object and receive signals having a direct path and indirect path and reflected and received from the object, a time of flight (ToF) detector configured to detect ToFs of the direct path and indirect path of each of the two or more sensors using the signals having the direct path and indirect path and received by each of the two or more sensors, and an object recognizer configured to recognize the object using the ToFs of the direct path and indirect path of each of the two or more sensors, detected by the ToF detector.

15 Claims, 5 Drawing Sheets

(51) Int. Cl.
  *G01S 7/539* (2006.01)
  *G01S 15/931* (2020.01)

(56) References Cited

U.S. PATENT DOCUMENTS

| | | | | |
|---|---|---|---|---|
| 2017/0176594 | A1* | 6/2017 | Ichikawa | G08G 1/166 |
| 2017/0242120 | A1* | 8/2017 | Matsuura | G01S 15/46 |
| 2020/0057897 | A1* | 2/2020 | Matsuura | G06V 20/58 |
| 2020/0096633 | A1* | 3/2020 | Matsuura | G01S 15/04 |
| 2020/0210722 | A1* | 7/2020 | Maeda | G01S 15/87 |

FOREIGN PATENT DOCUMENTS

| | | |
|---|---|---|
| KR | 10-2013-0046129 | 5/2013 |
| KR | 10-2015-0041307 | 4/2015 |

OTHER PUBLICATIONS

Office Action dated Jul. 12, 2023, in Chinese Patent Application No. 202011259793.0.

\* cited by examiner

APPARATUS AND METHOD FOR RECOGNIZING OBJECT

CROSS-REFERENCE TO RELATED APPLICATION

This application claims priority from and the benefit of Korean Patent Application No. 10-2019-0169549 filed on Dec. 18, 2019 which is hereby incorporated by reference for all purposes as if set forth herein.

BACKGROUND

Field

Exemplary embodiments relate to an object recognition apparatus and method for a vehicle, and more particularly, to an object recognition apparatus and method for a vehicle, in which ultrasonic signals having different frequencies are transmitted through two ultrasonic sensors and the type and shape of an object are recognized based on time of flights (ToFs) obtained by the two ultrasonic sensors, respectively.

Discussion of the Background

In general, a parking assistance system differentially generates three-step warnings based on a distance between a vehicle and an object. The parking assistance system issues the first warning when a distance between the vehicle and the object is 81 cm to 120 cm, issues the second warning when the distance is 41 cm to 80 cm, and issues the third warning when the distance is 40 cm or less.

An ultrasonic sensor is basically used in the parking assistance system. The control unit of the parking assistance system transmits an ultrasonic signal having a specific band through the ultrasonic sensor, and determines an approach direction and approach distance of an object at the rear of a vehicle by receiving the ultrasonic signal reflected by the object. In order to detect an object in front of the vehicle, four ultrasonic sensors (e.g., front right (FR), front center right (FCR), front center left (FCL), and front left (FL)) are disposed in front of the vehicle (i.e., front bumper). In order to detect a surrounding obstacle at the rear of the vehicle, four ultrasonic sensors (e.g., rear right (RR), rear center right (RCR), rear center left (RCL), and rear left (RL)) are disposed at the rear of the vehicle (i.e., rear bumper).

The Background Technology of the present disclosure is disclosed in Korean Patent Application Laid-Open No. 10-2013-0046129 (May 7, 2013) entitled "METHOD FOR DETECTING OBJECT OF AUTOMOBILE."

SUMMARY

A conventional ultrasonic sensor system detects an object and determines whether to issue a warning through the threshold tuning of signal intensity based on a distance.

However, the conventional ultrasonic sensor system has limits in identifying an object (e.g., PVC pipe), a road bump and an aluminum duct based on only the intensity of a signal near a distance of 1.2 m. Furthermore, the conventional ultrasonic sensor system may waste significant time and efforts in threshold tuning because it may generate a false alarm for a gravel signal detected around a distance of 2.2 m due to a difference in slight signal intensity from an object. Such a method dependent on the threshold tuning is vulnerable to an environment change, such as a temperature or humidity, and restricts detection performance of the ultrasonic sensor.

Various embodiments are directed to the provision of an object recognition apparatus and method for a vehicle, in which ultrasonic signals having different frequencies are transmitted through two ultrasonic sensors, respectively, and the type and shape of an object are recognized based on ToFs obtained by the respective ultrasonic sensors.

In an embodiment, an object recognition apparatus for a vehicle may include two or more sensors each configured to transmit a signal toward an object and receive signals having a direct path and indirect path and reflected and received from the object, a time of flight (ToF) detector configured to detect ToFs of the direct path and indirect path of each of the two or more sensors using the signals having the direct path and indirect path and received by each of the two or more sensors, and an object recognizer configured to recognize the object using the ToFs of the direct path and indirect path of each of the two or more sensors, detected by the ToF detector.

In an embodiment, the two or more sensors transmit signals having different frequencies.

In an embodiment, each of the two or more sensors receives a signal having a different frequency as a signal having an indirect path.

In an embodiment, the two or more sensors include a first sensor configured to transmit a first signal having a first frequency band and receive the first signal having a direct path and a second signal having an indirect path, which are reflected and received from the object, and a second sensor configured to transmit a second signal having a second frequency band and receive the second signal having a direct path and a first signal having an indirect path, which are reflected and received from the object.

In an embodiment, the apparatus further includes a sensing controller configured to modulate the frequencies of the first sensor and the second sensor, transmit the first signal through the first sensor, and transmit the second signal through the second sensor.

In an embodiment, the ToF detector detects a first direct path ToF and a first indirect path ToF using the first signal having the direct path and the second signal having the indirect path, respectively, which are received by the first sensor, and detects a second direct path ToF and a second indirect path ToF using the second signal having the direct path and the first signal having the indirect path, respectively, which are received by the second sensor.

In an embodiment, the object recognizer compares an error between the first indirect path ToF and the second indirect path ToF with a preset first threshold, and recognizes the object as gravel when the error exceeds the first threshold as a result of the comparison.

In an embodiment, the object recognizer compares, with a preset second threshold, a value obtained by subtracting a direct path mean value, obtained by averaging the first direct path ToF and the second direct path ToF, from an indirect path mean value obtained by averaging the first indirect path ToF and the second indirect path ToF, and determines that a detection error has occurred in at least one of the first sensor and the second sensor, based on a result of the comparison.

In an embodiment, the object recognizer compares, with a preset third threshold, a multiple of a square root of a value obtained by subtracting a square value of the direct path mean value from a square value of the indirect path mean value, and recognizes a width of the object based on a result of the comparison.

In an embodiment, the object recognizer recognizes the object as having a relatively narrow width when the multiple is the third threshold or less.

In an embodiment, the object recognizer recognizes the object as having a relatively wide width when the multiple exceeds the third threshold.

In an embodiment, the object recognizer compares at least one of a secondary differential value of the first direct path ToF and a secondary differential value of the second direct path ToF with a preset fourth threshold, and recognizes the height of the object based on a result of the comparison.

In an embodiment, the object recognizer determines the high and low of the object by dividing the high and low into three steps or more.

In an embodiment, the object recognizer recognizes the object as having a relatively high height when at least one of the secondary differential value of the first direct path ToF and the secondary differential value of the second direct path ToF is the fourth threshold or less.

In an embodiment, the object recognizer recognizes the object as having a relatively low height when at least one of the secondary differential value of the first direct path ToF and the secondary differential value of the second direct path ToF exceeds the fourth threshold.

In an embodiment, the fourth threshold is set based on at least one of a vehicle speed, a distance between the first sensor and the second sensor, and the ToFs of the direct path and indirect path of each of the first sensor and the second sensor in a previous schedule and a current schedule.

In an embodiment, an object recognition method for a vehicle may include transmitting, by a first sensor, a first signal having a first frequency band and receiving the first signal having a direct path and a second signal having an indirect path, which are reflected and received from an object, transmitting, by a second sensor, a second signal having a second frequency band and receiving the second signal having a direct path and a first signal having an indirect path, which are reflected and received from the object, detecting, by a time of flight (ToF) detector, ToFs of the direct path and indirect path of each of the first sensor and the second sensor using the first and second signals having the direct path and indirect path, which are received by each of the first sensor and the second sensor, and recognizing, by an object recognizer, the object using the ToFs of the direct path and indirect path of each of the first sensor and the second sensor, which are detected by the ToF detector.

In an embodiment, the first signal transmitted by the first sensor and the second signal transmitted by the second sensor have different frequencies.

In an embodiment, the first signal transmitted by the first sensor and the second signal transmitted by the second sensor are ultrasonic signals.

In an embodiment, in the detecting of the ToF, the ToF detector detects a first direct path ToF and a first indirect path ToF using the first signal having the direct path and the second signal having the indirect path, respectively, which are received by the first sensor, and detects a second direct path ToF and a second indirect path ToF using the second signal having the direct path and the first signal having the indirect path, respectively, which are received by the second sensor.

In an embodiment, in the recognizing of the object, the object recognizer compares an error between the first indirect path ToF and the second indirect path ToF with a preset first threshold and recognizes the object as gravel when the error exceeds the first threshold as a result of the comparison.

In an embodiment, in the recognizing of the object, the object recognizer compares, with a preset second threshold, a value obtained by subtracting a direct path mean value, obtained by averaging the first direct path ToF and the second direct path ToF, from an indirect path mean value obtained by averaging the first indirect path ToF and the second indirect path ToF and determines that a detection error has occurred in at least one of the first sensor and the second sensor, based on a result of the comparison.

In an embodiment, in the recognizing of the object, the object recognizer compares, with a preset third threshold, a multiple of a square root of a value obtained by subtracting a square value of the direct path mean value from a square value of the indirect path mean value and recognizes a width of the object based on a result of the comparison.

In an embodiment, in the recognizing of the object, the object recognizer recognizes the object as having a relatively small width when the multiple is the third threshold or less.

In an embodiment, in the recognizing of the object, the object recognizer recognizes the object as having a relatively large width when the multiple exceeds the third threshold.

In an embodiment, in the recognizing of the object, the object recognizer compares at least one of a secondary differential value of the first direct path ToF and a secondary differential value of the second direct path ToF with a preset fourth threshold, and recognizes the height of the object based on a result of the comparison.

In an embodiment, in the recognizing of the object, the object recognizer determines the high and low of the object by dividing the high and low into three steps or more.

In an embodiment, in the recognizing of the object, the object recognizer recognizes the object as having a relatively large height when at least one of the secondary differential value of the first direct path ToF and the secondary differential value of the second direct path ToF is the fourth threshold or less.

In an embodiment, in the recognizing of the object, the object recognizer recognizes the object as having a relatively small height when at least one of the secondary differential value of the first direct path ToF and the secondary differential value of the second direct path ToF exceeds the fourth threshold.

In an embodiment, the fourth threshold is set based on at least one of a vehicle speed, a distance between the first sensor and the second sensor, and the ToFs of the direct path and indirect path of each of the first sensor and the second sensor in a previous schedule and a current schedule.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
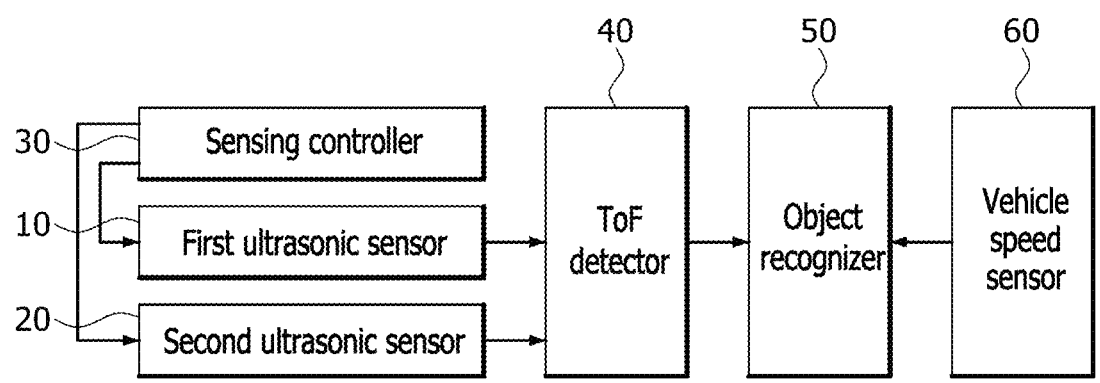
FIG. 1 is a block diagram of an object recognition apparatus for a vehicle according to an embodiment of the present disclosure.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an object recognition apparatus and method for a vehicle will be described with reference to the accompanying drawings through various exemplary embodiments. In describing the present disclosure, a detailed description of a related known function or configuration will be omitted if it is deemed to make the gist of the present disclosure unnecessarily vague. Furthermore, terms to be described hereunder have been defined by taking into consideration functions in the present disclosure, and may be different depending on a user, an operator's intention or practice. Accordingly, each term should be defined based on contents over the entire specification.

An implementation described in this specification may be materialized in the form of a method or a process, an apparatus, a software program, a data stream or a signal, for example. Although the present disclosure has been discussed in the context of an implementation of a single form (e.g., discussed as a method only), an implementation having a discussed characteristic may be implemented in other forms (e.g., apparatus or program). The apparatus may be implemented as proper hardware, software and firmware. The method may be implemented in an apparatus, such as a processor commonly referring to a processing device, including a computer, a microprocessor, an integrated circuit or a programmable logic device, for example. The processor includes a communication device, such as a computer, a cell phone, a mobile/personal digital assistant (PDA) and other devices which facilitate the communication of information between end users.

Figure 2:
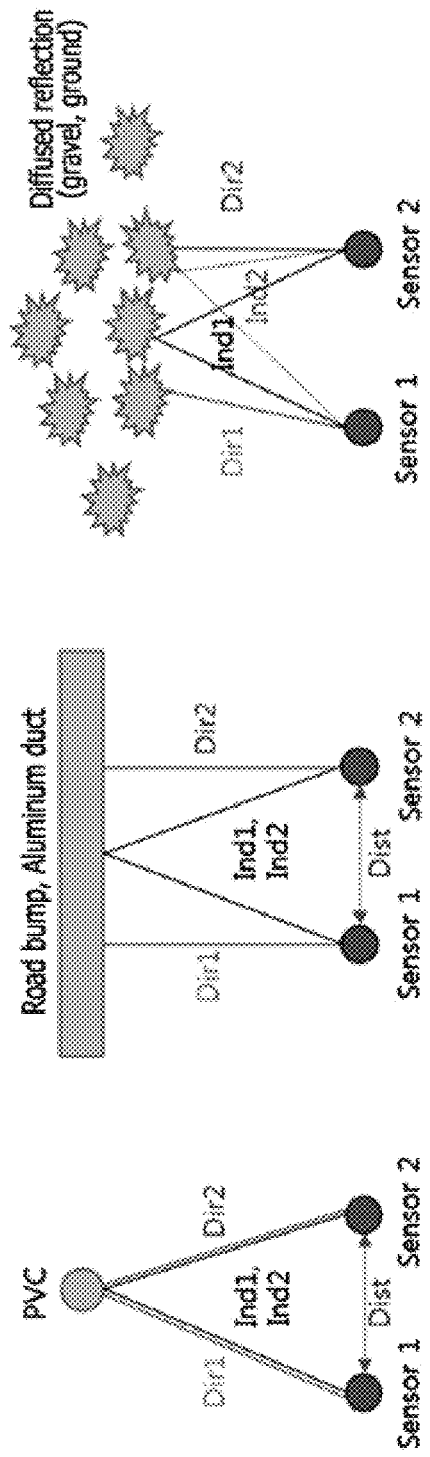
FIG. 2 is a diagram illustrating direct paths and indirect warnings based on the type of object according to an embodiment of the present disclosure.
Figure 3:
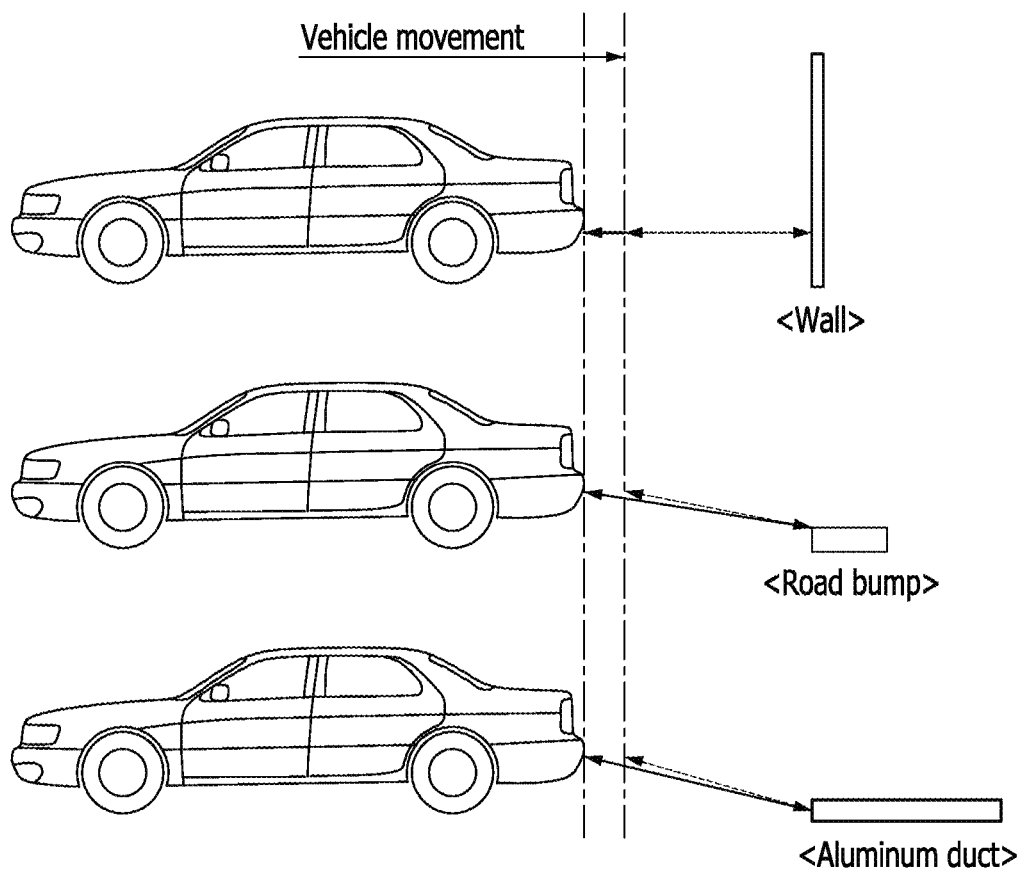
FIG. 3 is a diagram illustrating the height of an object for an ultrasonic sensor according to an embodiment of the present disclosure.
Figure 4:
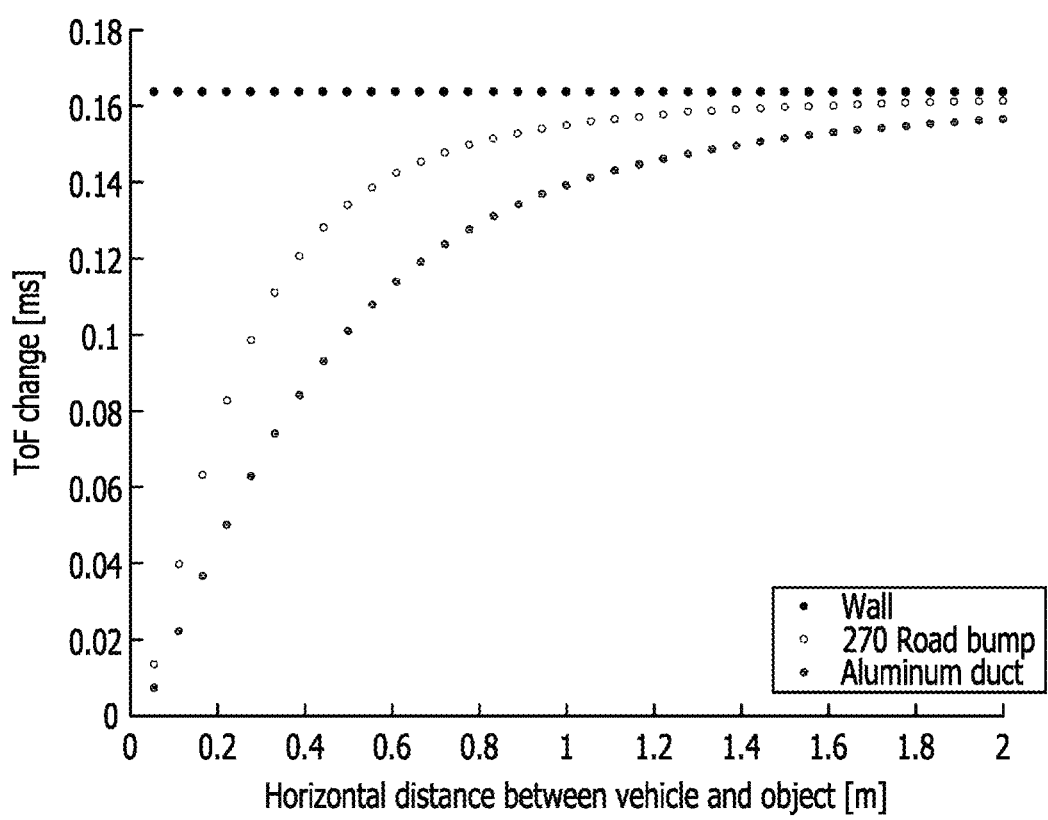
FIG. 4 is a diagram illustrating a ToF change for a horizontal distance between a vehicle and an object according to an embodiment of the present disclosure.

FIG. 1 is a block diagram of an object recognition apparatus for a vehicle according to an embodiment of the present disclosure. FIG. 2 is a diagram illustrating direct paths and indirect warnings based on the type of object according to an embodiment of the present disclosure. FIG. 3 is a diagram illustrating the height of an object for an ultrasonic sensor according to an embodiment of the present disclosure. FIG. 4 is a diagram illustrating a time of flight (ToF) change for a horizontal distance between a vehicle and an object according to an embodiment of the present disclosure.

Referring to FIG. 1, the object recognition apparatus for a vehicle according to an embodiment of the present disclosure includes a first sensor, a second sensor, a sensing controller 30, a ToF detector 40, an object recognizer 50 and a vehicle speed sensor 60.

The first sensor is positioned on one side at the rear of a vehicle. The first sensor transmits a first signal having a preset frequency band and receives the first signal having a direct path and a second signal having an indirect path, which are reflected and received from an object. In this case, the first signal having the direct path and the second signal having the indirect path, received by the first sensor, have different frequencies.

The second sensor is positioned on the other side of the first sensor at the rear of the vehicle. The second sensor transmits a second signal having a preset frequency band, and receives the second signal having a direct path and a first signal having an indirect path, which are reflected and received from an object. In this case, a signal having a direct path and a signal having an indirect path have different frequencies. That is, the second signal having the direct path and the first signal having the indirect path, received by the second sensor, have different frequencies.

In the present embodiment, it has been illustrated that a sensor using transmission wave modulation is divided into the first sensor and the second sensor, each one transmitting and receiving the first signal and second signal having different frequency bands. However, the technical range of the present disclosure is not limited thereto and a plurality of sensors may be provided. The plurality of sensors may transmit signals having different frequency bands and receive indirect signals.

In the present embodiment, the first sensor and the second sensor will be illustrated as ultrasonic sensors transmitting and receiving ultrasonic signals. A first ultrasonic sensor 10 will be illustrated as the first sensor, and a second ultrasonic sensor 20 will be illustrated as the second sensor.

The vehicle speed sensor 60 detects a vehicle speed of a vehicle.

The first ultrasonic sensor 10 is positioned on one side at the rear of a vehicle. The first ultrasonic sensor 10 transmits a first ultrasonic signal having a first frequency band, and receives the first ultrasonic signal having a direct path and a second ultrasonic signal having an indirect path, which are reflected and received from an object.

The first ultrasonic signal is an ultrasonic signal having the first frequency band, which is transmitted from the first ultrasonic sensor 10 toward the object, reflected by the object and then received by the first ultrasonic sensor 10.

The second ultrasonic signal is an ultrasonic signal having the second frequency band, which is transmitted from the second ultrasonic sensor 20 toward the object, reflected by the object and then received by the first ultrasonic sensor 10.

The second ultrasonic sensor 20 is positioned on the other side of the first ultrasonic sensor 10 at the rear of the vehicle. The second ultrasonic sensor 20 transmits a second ultrasonic signal having a second frequency band, and receives the second ultrasonic signal having a direct path and a first ultrasonic signal having an indirect path, which are reflected and received from an object.

The second ultrasonic signal is an ultrasonic signal having the second frequency band, which is transmitted from the second ultrasonic sensor 20 toward the object, reflected by the object and then received by the second ultrasonic sensor 20.

The first ultrasonic signal is an ultrasonic signal having the first frequency band, which is transmitted from the first ultrasonic sensor 10 toward the object, reflected by the object and then received by the second ultrasonic sensor 20.

That is, the first ultrasonic sensor 10 and the second ultrasonic sensor 20 transmit the first ultrasonic signal and second ultrasonic signal having the first frequency band and second frequency band whose frequencies are different from each other. In this case, the first ultrasonic sensor 10 receives the second ultrasonic signal having the indirect path along with the first ultrasonic signal having the direct path. The second ultrasonic sensor 20 receives the first ultrasonic signal having the indirect path along with the second ultrasonic signal having the direct path.

In this case, the direct path is an ultrasonic signal path if a transmitted ultrasonic signal (i.e., the first ultrasonic signal or the second ultrasonic signal) is reflected by an object and then received by an ultrasonic sensor (i.e., the first ultrasonic sensor 10 or the second ultrasonic sensor 20) that has transmitted the corresponding ultrasonic signal (i.e., the first ultrasonic signal or the second ultrasonic signal).

The indirect path is an ultrasonic signal path if a transmitted ultrasonic signal (i.e., the first ultrasonic signal or the second ultrasonic signal) is reflected by an object and then received by another adjacent ultrasonic sensor (i.e., the second ultrasonic sensor 20 or the first ultrasonic sensor 10).

The sensing controller 30 controls the first ultrasonic sensor 10 and the second ultrasonic sensor 20 to transmit ultrasonic signals having different frequency bands. That is, the sensing controller 30 modulates the frequencies of the first ultrasonic sensor 10 and the second ultrasonic sensor 20, transmits the first ultrasonic signal having the first frequency band through the first ultrasonic sensor 10, and transmits the second ultrasonic signal having the second frequency band through the second ultrasonic sensor 20.

The ToF detector 40 detects the ToFs of the direct path and indirect path of each of the first ultrasonic sensor 10 and the second ultrasonic sensor 20 using ultrasonic signals having a direct path and indirect path, which are received by each of the first ultrasonic sensor 10 and the second ultrasonic sensor 20.

That is, the ToF detector 40 detects a first direct path ToF (ToF_Dir1) and a first indirect path ToF (ToF_Ind1) using the first ultrasonic signal having the direct path and the second ultrasonic signal having the indirect path, respectively, which are received by the first ultrasonic sensor 10, and detects a second direct path ToF (ToF_Dir2) and a second indirect path ToF (ToF_Ind2) using the second ultrasonic signal having the direct path and the first ultrasonic signal having the indirect path, respectively, which are received by the second ultrasonic sensor 20.

In this case, a ToF detected using the first ultrasonic signal having the direct path, which is transmitted by the first ultrasonic sensor 10, reflected by the object and then received by the first ultrasonic sensor 10, is called the first direct path ToF (ToF_Dir1). A ToF detected with respect to the second ultrasonic signal having the indirect path, which is transmitted by the second ultrasonic sensor 20, reflected by the object and then received by the first ultrasonic sensor 10, is called the first indirect path ToF (ToF_Ind1).

Furthermore, a ToF detected with respect to the second ultrasonic signal having the direct path, which is transmitted by the second ultrasonic sensor 20, reflected by the object and then received by the second ultrasonic sensor 20, is called the second direct path ToF (ToF_Dir2). A ToF detected with respect to the first ultrasonic signal having the indirect path, which is transmitted by the first ultrasonic sensor 10, reflected by the object and then received by the second ultrasonic sensor 20, is called the second indirect path ToF (ToF_Ind2).

The object recognizer 50 recognizes an object using the ToFs of the direct path and indirect path of each of the first ultrasonic sensor 10 and the second ultrasonic sensor 20, which are detected by the ToF detector 40.

Referring to FIG. 2, the first ultrasonic signal and second ultrasonic signal transmitted by the first ultrasonic sensor 10 and the second ultrasonic sensor 20 may have different direct paths and different indirect paths depending on an object and a shape of the object.

That is, in the case of an object having a relatively small width, the direct path of the first ultrasonic signal and the indirect path of the second ultrasonic signal are the same. The direct path of the second ultrasonic signal and the indirect path of the first ultrasonic signal are the same.

In the case of an object having a relatively large width, the direct path of the first ultrasonic signal is shorter than the indirect path of the second ultrasonic signal. The direct path of the second ultrasonic signal is shorter than the indirect path of the first ultrasonic signal.

Furthermore, in the case of gravel or the ground, since the first ultrasonic signal and the second ultrasonic signal are subjected to diffused reflection by the gravel or the ground, the first ultrasonic signal having the direct path and the second ultrasonic signal having the indirect path are not the same, and the second ultrasonic signal having the direct path and the first ultrasonic signal having the indirect path are not the same.

Moreover, referring to FIG. 3, the height of an object may be the same as or lower than the heights of the first ultrasonic sensor 10 and the second ultrasonic sensor 20.

Accordingly, in order to recognize an object and a shape of the object, for example, the width and height of the object, a plurality of thresholds (e.g., first threshold to fourth threshold) corresponding to the object and the shape of the object are previously set in the object recognizer 50. Accordingly, the object recognizer 50 recognizes the object and the shape of the object based on the plurality of thresholds.

When the ToF detector 40 detects the first direct path ToF (ToF_Dir1) and the first indirect path ToF (ToF_Ind1) using the first ultrasonic signal having the direct path and the second ultrasonic signal having the indirect path, respectively, received by the first ultrasonic sensor 10, and detects the second direct path ToF (ToF_Dir2) and the second indirect path ToF (ToF_Ind2) using the second ultrasonic signal having the direct path and the first ultrasonic signal having the indirect path, respectively, received by the second ultrasonic sensor 20, first, the object recognizer 50 compares an error between the first indirect path ToF (ToF_Ind1) and the second indirect path ToF (ToF_Ind2) with a preset first threshold.

That is, the object recognizer 50 determines whether the error between the first indirect path ToF (ToF_Ind1) and the second indirect path ToF (ToF_Ind2) is the first threshold or less, and recognizes the object as gravel when the error exceeds the first threshold as a result of the determination.

In this case, the error between the first indirect path ToF (ToF_Ind1) and the second indirect path ToF (ToF_Ind2) is an absolute value of a value obtained by subtracting the second indirect path ToF (ToF_Ind2) from the first indirect path ToF (ToF_Ind1).

The first threshold is an error set by considering that a ToF difference may occur between signals, received along the same path, due to a change in the surrounding environment or in a data conversion process. For example, 588 μs may be adopted as the first threshold.

In contrast, when the error between the first indirect path ToF (ToF_Ind1) and the second indirect path ToF (ToF_Ind2) is the first threshold or less, the object recognizer 50 detects a direct path mean value (Dir=(ToF_Dir1+ToF_Dir2)/2), obtained by averaging the first direct path ToF (ToF_Dir1) and the second direct path ToF (ToF_Dir2), and an indirect path mean value (Ind=(ToF_Ind1+ToF_Ind2)/2), obtained by averaging the first indirect path ToF (ToF_Ind1) and the second indirect path ToF (ToF_Ind2).

Next, the object recognizer 50 compares a value, obtained by subtracting the direct path mean value (Dir=(ToF_Dir1+ToF_Dir2)/2) from the indirect path mean value (Ind=(ToF_Ind1+ToF_Ind2)/2), with a preset second threshold, and determines that a detection error has occurred in at least one of the first ultrasonic sensor 10 and the second ultrasonic sensor 20 based on a result of the comparison.

For example, the object recognizer 50 determines whether the value, obtained by subtracting the direct path mean value (Dir=(ToF_Dir1+ToF_Dir2)/2) from the indirect path mean value (Ind=(ToF_Ind1+ToF_Ind2)/2), is the second threshold or more, and determines that a detection error has occurred in at least one of the first ultrasonic sensor 10 and the second ultrasonic sensor 20 when the value obtained by subtracting the direct path mean value (Dir=(ToF_Dir1+ToF_Dir2)/2) from the indirect path mean value (Ind=(ToF_Ind1+ToF_Ind2)/2) is less than the second threshold as a result of the determination.

In this case, with respect to one object, the indirect path ToF is normally greater than the direct path ToF, but an error may occur due to a change in the surrounding environment or in a data conversion process. Accordingly, the second threshold may be set by taking the error into consideration. For example, −294 μs may be adopted as the second threshold.

In contrast, when the value obtained by subtracting the direct path mean value (Dir=(ToF_Dir1+ToF_Dir2)/2) from the indirect path mean value (Ind=(ToF_Ind1+ToF_Ind2)/2) is the second threshold or more, the object recognizer 50 detects the multiple of a square root (2×sqrt(Ind×Ind−Dir×Dir)) of a value obtained by subtracting a square value of the direct path mean value (Dir=(ToF_Dir1+ToF_Dir2)/2) from a square value of the indirect path mean value (Ind=(ToF_Ind1+ToF_Ind2)/2), compares the multiple (2×sqrt(Ind×Ind−Dir×Dir)) with a preset third threshold, and recognizes the width of the object based on a result of the comparison.

In this case, when the multiple (2×sqrt(Ind×Ind−Dir×Dir)) is the third threshold or less, the object recognizer 50 recognizes the object as having a relatively small width. Such an object having a relatively small width may be a polyvinyl chloride (PVC) pipe, for example.

When the multiple (2×sqrt(Ind×Ind−Dir×Dir)) exceeds the third threshold, the object recognizer 50 recognizes the object as having a relatively large width. Such an object having a relatively large width may be a road bump, an aluminum duct or a wall, for example.

The third threshold may be set to be smaller than a value obtained by dividing the interval between the first ultrasonic sensor 10 and the second ultrasonic sensor 20 (i.e., an interval between sensors mounted on a bumper) by the large width of an object, and may be set to be greater than a value obtained by dividing the interval between the first ultrasonic sensor 10 and the second ultrasonic sensor 20 (i.e., an interval between sensors mounted on a bumper) by the small width of an object. For example, 1,765 μs may be adopted as the third threshold.

When recognizing the object as having a relatively large width as described above, the object recognizer 50 recognizes the height of the object.

That is, the object recognizer 50 differentiates a secondary differential value of the first direct path ToF (ToF_Dir1) and a secondary differential value of the second direct path ToF (ToF_Dir2), compares at least one of the secondary differential values with a preset fourth threshold, and recognizes the height of the object based on a result of the comparison.

For example, the object recognizer 50 determines whether at least one of the secondary differential value of the first direct path ToF (ToF_Dir1) and the secondary differential value of the second direct path ToF (ToF_Dir2) is the fourth threshold or less, and recognizes the object as having a relatively large height when at least one of the secondary differential value of the first direct path ToF (ToF_Dir1) and the secondary differential value of the second direct path ToF (ToF_Dir2) is the fourth threshold or less as a result of the determination. Such an object having a relatively large height may be a wall, for example.

In contrast, when at least one of the secondary differential value of the first direct path ToF (ToF_Dir1) and the secondary differential value of the second direct path ToF (ToF_Dir2) exceeds the fourth threshold, the object recognizer 50 recognizes the object as having a relatively small height. Such an object having a relatively small height may be an aluminum duct or a road bump, for example.

Referring to FIG. 4, if the height of the object is the same as the height of the first ultrasonic sensor 10 or the second ultrasonic sensor 20, each of the secondary differential value of the first direct path ToF (ToF_Dir1) and the secondary differential value of the second direct path ToF (ToF_Dir2) is constant, that is, close to 0. In contrast, if the height of the object is lower than the height of the first ultrasonic sensor 10 or the second ultrasonic sensor 20, each of the secondary differential value of the first direct path ToF (ToF_Dir1) and the secondary differential value of the second direct path ToF (ToF_Dir2) is a positive number, and increases as the distance between the ultrasonic sensor and the object is decreased.

For reference, FIG. 4 illustrates the results of simulations if a vehicle speed was 5 kph, the interval in which the ToF detector 40 obtained data (i.e., the first direct path ToF (ToF_Dir1), the first indirect path ToF (ToF_Ind1), the second direct path ToF (ToF_Dir2) and the second indirect path ToF (ToF_Ind2)) was 4 ms, the distance between the first ultrasonic sensor 10 and the second ultrasonic sensor 20 was 60 cm, the height of each of the first ultrasonic sensor 10 and the second ultrasonic sensor 20 was 60 cm, and the height of a road bump was 27 cm. FIG. 4 illustrates a primary differential value of the first direct path ToF (ToF_Dir1).

In this case, a ToF difference may occur between signals, received along the same path, due to a change in the surrounding environment or in a data conversion process. Accordingly, the fourth threshold may be set by taking such an error into consideration. For example, 0.0000003675[1/us]+x (acceleration/sonic) may be adopted as the fourth threshold.

Particularly, the fourth threshold may be variously set based on at least one of a vehicle speed, a distance between the first ultrasonic sensor 10 and the second ultrasonic sensor 20, and the ToFs of the direct path and indirect path of each of the first ultrasonic sensor 10 and the second ultrasonic sensor 20 in a previous schedule and a current schedule. For example, the fourth threshold may be increased or decreased as acceleration/sonic if the acceleration of a vehicle is increased or decreased.

Hereinafter, an object recognition method for a vehicle according to an embodiment of the present disclosure is described in detail with reference to FIG. 5.

Figure 5:
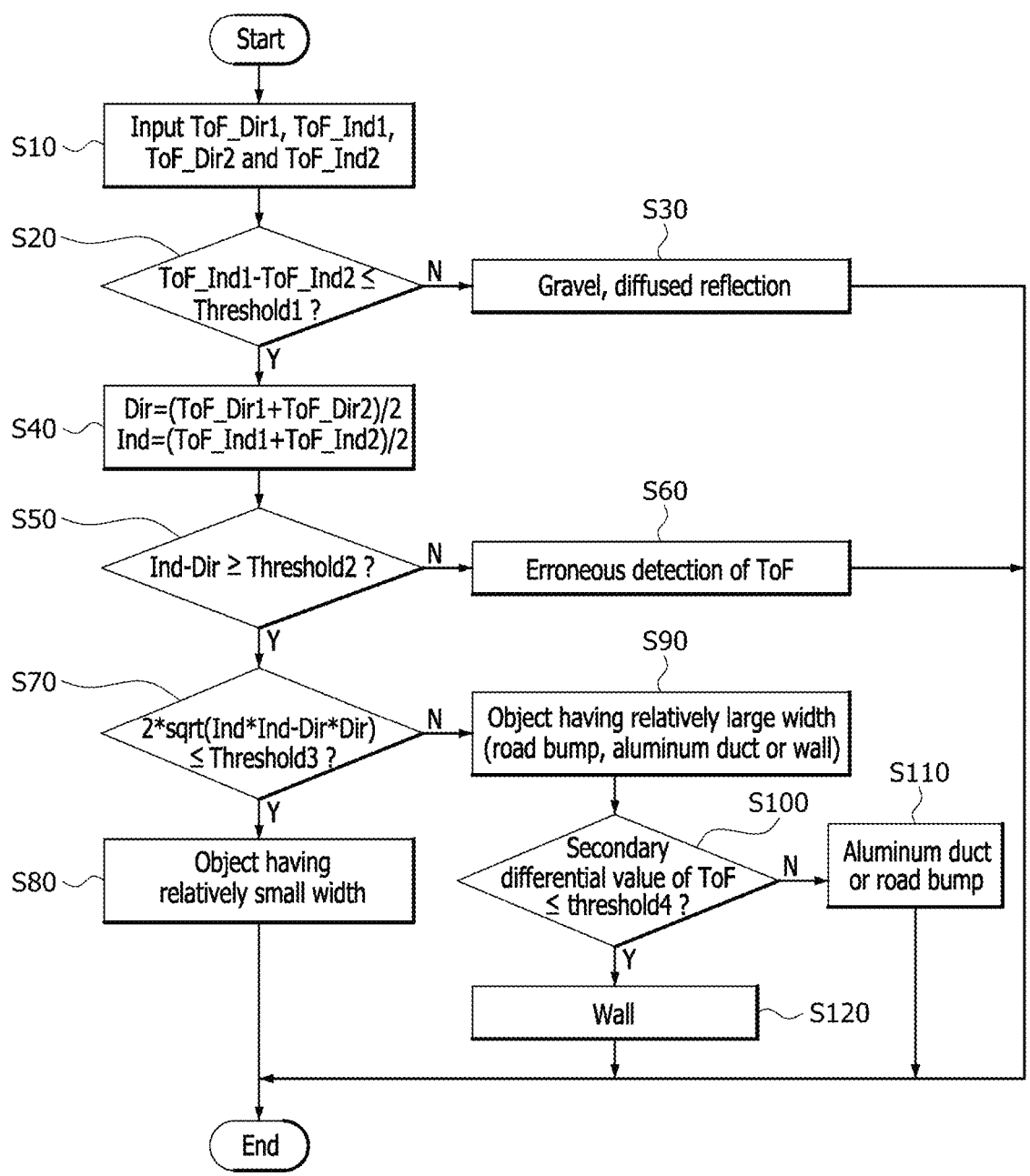
FIG. 5 is a flowchart illustrating an object recognition method for a vehicle according to an embodiment of the present disclosure.

FIG. 5 is a flowchart illustrating an object recognition method for a vehicle according to an embodiment of the present disclosure.

Referring to FIG. 5, the sensing controller 30 controls the first ultrasonic sensor 10 and the second ultrasonic sensor 20 to transmit ultrasonic signals having different frequency bands, respectively.

Accordingly, the first ultrasonic sensor 10 transmits a first ultrasonic signal having a first frequency band, and receives the first ultrasonic signal having a direct path and a second ultrasonic signal having an indirect path, which are reflected and received from an object. The second ultrasonic sensor 20 transmits a second ultrasonic signal having a second frequency band, and receives the second ultrasonic signal having a direct path and a first ultrasonic signal having an indirect path, which are reflected and received from the object.

Accordingly, the ToF detector 40 detects a first direct path ToF (ToF_Dir1) and a first indirect path ToF (ToF_Ind1) using the first ultrasonic signal having the direct path and the second ultrasonic signal having the indirect path, respectively, received by the first ultrasonic sensor 10, and detects a second direct path ToF (ToF_Dir2) and a second indirect path ToF (ToF_Ind2) using the second ultrasonic signal having the direct path and the first ultrasonic signal having the indirect path, respectively, received by the second ultrasonic sensor 20. The object recognizer 50 receives the first direct path ToF (ToF_Dir1), the first indirect path ToF (ToF_Ind1), the second direct path ToF (ToF_Dir2) and the second indirect path ToF (ToF_Ind2) (S10).

Next, the object recognizer 50 determines whether an error between the first indirect path ToF (ToF_Ind1) and the second indirect path ToF (ToF_Ind2) is a first threshold or less (S20).

If, as a result of the determination at step S20, the error exceeds the first threshold, the object recognizer 50 recognizes the object as gravel (S30).

In contrast, if, as a result of the determination at step S20, the error between the first indirect path ToF (ToF_Ind1) and the second indirect path ToF (ToF_Ind2) is the first threshold or less, the object recognizer 50 detects a direct path mean value (Dir=(ToF_Dir1+ToF_Dir2)/2), obtained by averaging the first direct path ToF (ToF_Dir1) and the second direct path ToF (ToF_Dir2), and an indirect path mean value (Ind=(ToF_Ind1+ToF_Ind2)/2), obtained by averaging the first indirect path ToF (ToF_Ind1) and the second indirect path ToF (ToF_Ind2) (S40).

Next, the object recognizer 50 determines whether a value obtained by subtracting the direct path mean value (Dir=(ToF_Dir1+ToF_Dir2)/2) from the indirect path mean value (Ind=(ToF_Ind1+ToF_Ind2)/2) is a second threshold or more (S50).

If, as a result of the determination at step S50, the value obtained by subtracting the direct path mean value (Dir=(ToF_Dir1+ToF_Dir2)/2) from the indirect path mean value (Ind=(ToF_Ind1+ToF_Ind2)/2) is less than the second threshold, the object recognizer 50 determines that a detection error has occurred in at least one of the first ultrasonic sensor 10 and the second ultrasonic sensor 20 (S60).

In contrast, if, as a result of the determination at step S50, the value obtained by subtracting the direct path mean value (Dir=(ToF_Dir1+ToF_Dir2)/2) from the indirect path mean value (Ind=(ToF_Ind1+ToF_Ind2)/2) is the second threshold or more, the object recognizer 50 detects the multiple of a square root (2×sqrt(Ind×Ind-Dir×Dir)) of a value obtained by subtracting a square value of the direct path mean value (Dir=(ToF_Dir1+ToF_Dir2)/2) from a square value of the indirect path mean value (Ind=(ToF_Ind1+ToF_Ind2)/2), and determines whether the multiple (2×sqrt(Ind×Ind-Dir×Dir)) is a third threshold or less (S70).

If, as a result of the determination at step S70, the multiple (2×sqrt(Ind×Ind-Dir×Dir)) is the third threshold or less, the object recognizer 50 recognizes the object as having a relatively small width (S80).

In contrast, if, as a result of the determination at step S70, the multiple (2×sqrt(Ind×Ind-Dir×Dir)) exceeds the third threshold, the object recognizer 50 recognizes the object as having a relatively large width, for example, a road bump, an aluminum duct or a wall (S90).

When recognizing the object as having a relatively large width as described above, the object recognizer 50 differentiates a secondary differential value of the first direct path ToF (ToF_Dir1) and a secondary differential value of the second direct path ToF (ToF_Dir2).

The object recognizer 50 determines whether at least one of the secondary differential value of the first direct path ToF (ToF_Dir1) and the secondary differential value of the second direct path ToF (ToF_Dir2) is a fourth threshold or less (S100). If, as a result of the determination at step S100, at least one of the secondary differential value of the first direct path ToF (ToF_Dir1) and the secondary differential value of the second direct path ToF (ToF_Dir2) is the fourth threshold or less, the object recognizer 50 recognizes the object as having a relatively large height, for example, a wall (S120).

In contrast, if, as a result of the determination at step S100, at least one of the secondary differential value of the first direct path ToF (ToF_Dir1) and the secondary differential value of the second direct path ToF (ToF_Dir2) exceeds the fourth threshold, the object recognizer 50 recognizes the object as having a relatively small height, for example, an aluminum duct or a road bump (S110).

In this case, the fourth threshold may be variously set based on at least one of a vehicle speed, a distance between the first ultrasonic sensor 10 and the second ultrasonic sensor 20, and the ToFs of the direct path and indirect path of each of the first ultrasonic sensor 10 and the second ultrasonic sensor 20 in a previous schedule and a current schedule. For example, the fourth threshold may be increased or decreased as acceleration/sonic if the acceleration of a vehicle is increased or decreased.

As described above, in the object recognition apparatus and method for a vehicle according to an embodiment of the present disclosure, ultrasonic signals having different frequencies are transmitted through two ultrasonic sensors, respectively. The type and shape of an object are recognized based on ToFs obtained through the respective ultrasonic sensors.

Furthermore, the object recognition apparatus and method for a vehicle according to an embodiment of the present disclosure can improve object tracking performance by recognizing the type and shape of an object and improve performance of a collision warning device by reducing erroneous braking of a vehicle.

Moreover, the object recognition apparatus and method for a vehicle according to an embodiment of the present disclosure can increase a maximum detection distance by differently setting a threshold depending on the type of object, and can improve the robustness of object detection logic by identifying gravel at a close range.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An object recognition apparatus for a vehicle, the apparatus comprising:
    two or more sensors each configured to transmit a signal toward an object and to receive signals having a direct path and indirect path and reflected and received from the object;
    a time of flight detector configured to detect time of flights of the direct path and indirect path of each of the two or more sensors using the signals having the direct path and indirect path and received by each of the two or more sensors; and
    an object recognizer configured to recognize the object using the time of flights of the direct path and indirect path of each of the two or more sensors, detected by the time of flight detector,
    wherein the two or more sensors comprise:
    a first sensor configured to transmit a first signal having a first frequency band and receive the first signal having a direct path and a second signal having an indirect path, which are reflected and received from the object; and
    a second sensor configured to transmit a third signal having a second frequency band and receive the third signal having a direct path and a fourth signal having an indirect path, which are reflected and received from the object,
    wherein the time of flight detector is configured to:
    detect a first direct path time of flight and a first indirect path time of flight using the first signal having the direct path and the second signal having the indirect path, respectively, which are received by the first sensor, and
    detect a second direct path time of flight and a second indirect path time of flight using the third signal having the direct path and the fourth signal having the indirect path, respectively, which are received by the second sensor, and
    wherein the object recognizer is configured to:
    compare an error between the first indirect path time of flight and the second indirect path time of flight with a preset first threshold, and
    recognize the object as gravel when the error exceeds the first threshold as a result of the comparison.

2. The apparatus of claim 1, wherein the two or more sensors are configured to transmit signals having different frequencies.

3. The apparatus of claim 2, wherein each of the two or more sensors is configured to receive a signal having a different frequency as a signal having an indirect path.

4. The apparatus of claim 1, further comprising a sensing controller configured to modulate the frequencies of the first sensor and the second sensor, to transmit the first signal through the first sensor, and to transmit the third signal through the second sensor.

5. The apparatus of claim 1, wherein the object recognizer is configured to compare, with a preset second threshold, a value obtained by subtracting a direct path mean value, obtained by averaging the first direct path time of flight and the second direct path time of flight, from an indirect path mean value obtained by averaging the first indirect path time of flight and the second indirect path time of flight, and
    determine that a detection error has occurred in at least one of the first sensor and the second sensor, based on a result of the comparison.

6. The apparatus of claim 1, wherein the object recognizer is configured to compare, with a preset third threshold, a multiple of a square root of a value obtained by subtracting a square value of a direct path mean value from a square value of an indirect path mean value, and
    recognize a width of the object based on a result of the comparison.

7. The apparatus of claim 6, wherein the object recognizer is configured to:
    recognize the object as having a relatively small width when the multiple is the third threshold or less, and
    recognize the object as having a relatively large width when the multiple exceeds the third threshold.

8. A method for object recognition for a vehicle, the method comprising the steps of:
    transmitting, from a first sensor, a first signal having a first frequency band and receiving the first signal having a direct path and a second signal having an indirect path;
    transmitting, from a second sensor, a third signal having a second frequency band and receiving the third signal having a direct path and a fourth signal having an indirect path, wherein the first, second, third, and fourth signals are reflected and received from an object;
    detecting, by a time of flight detector, time of flights of the direct path and indirect path of each of the first sensor and the second sensor using the first, second, third and fourth signals; and
    recognizing the object using the time of flights of the direct path and indirect path of each of the first sensor and the second sensor, which are detected by the time of flight detector,
    wherein the detecting of the time of flight is performed by the time of flight detector that detects a first direct path time of flight and a first indirect path time of flight using the first signal having the direct path and the second signal having the indirect path, respectively, which are received by the first sensor, and detects a second direct path time of flight and a second indirect path time of flight using the third signal having the direct path and the fourth signal having the indirect path, respectively, which are received by the second sensor, and wherein the recognizing of the object is performed by an object recognizer that compares, with a preset second threshold, a value obtained by subtracting a direct path mean value, obtained by averaging the first direct path time of flight and the second direct path time of flight, from an indirect path mean value obtained by averaging the first indirect path time of flight and the second indirect path time of flight and determines that a detection error has occurred in at least one of the first sensor and the second sensor, based on a result of the comparison.

9. The method of claim 8, wherein the first signal transmitted by a first sensor and the third signal transmitted the second sensor have different frequencies.

10. The method of claim 9, wherein the first signal transmitted by the first sensor and the third signal transmitted by the second sensor are ultrasonic signals.

11. The method of claim 8, wherein the recognizing of the object is performed by the object recognizer that compares an error between the first indirect path time of flight and the second indirect path time of flight with a preset first threshold and recognizes the object as gravel when the error exceeds the first threshold as a result of the comparison.

12. The method of claim 8, wherein the recognizing of the object is performed by the object recognizer that compares, with a preset third threshold, a multiple of a square root of a value obtained by subtracting a square value of the direct path mean value from a square value of the indirect path mean value and recognizes a width of the object based on a result of the comparison.

13. The method of claim 12, wherein the object recognizer recognizes the object as having a relatively small width when the multiple is the third threshold or less.

14. The method of claim 12, wherein the object recognizer recognizes the object as having a relatively large width when the multiple exceeds the third threshold.

15. A method for object recognition for a vehicle, the method comprising the steps of:

transmitting, from a first sensor, a first signal having a first frequency band and receiving the first signal having a direct path and a second signal having an indirect path;

transmitting, from a second sensor, a third signal having a second frequency band and receiving the third signal having a direct path and a fourth signal having an indirect path wherein the first, second, third, and fourth signals are reflected and received from an object;

detecting, by a time of flight detector, time of flights of the direct path and indirect path of each of the first sensor and the second sensor using the first, second, third, and fourth signals; and recognizing the object using the time of flights of the direct path and indirect path of each of the first sensor and the second sensor, which are detected by the time of flight detector, wherein the detecting of the time of flight is performed by the time of flight detector that detects a first direct path time of flight and a first indirect path time of flight using the first signal having the direct path and the second signal having the indirect path, respectively, which are received by the first sensor, and detects a second direct path time of flight and a second indirect path time of flight using the third signal having the direct path and the fourth signal having the indirect path, respectively, which are received by the second sensor, and wherein the recognizing of the object is performed by an object recognizer that compares, with a preset third threshold, a multiple of a square root of a value obtained by subtracting a square value of the direct path mean value from a square value of the indirect path mean value and recognizes a width of the object based on a result of the comparison.

* * * * *